UNITED STATES PATENT OFFICE.

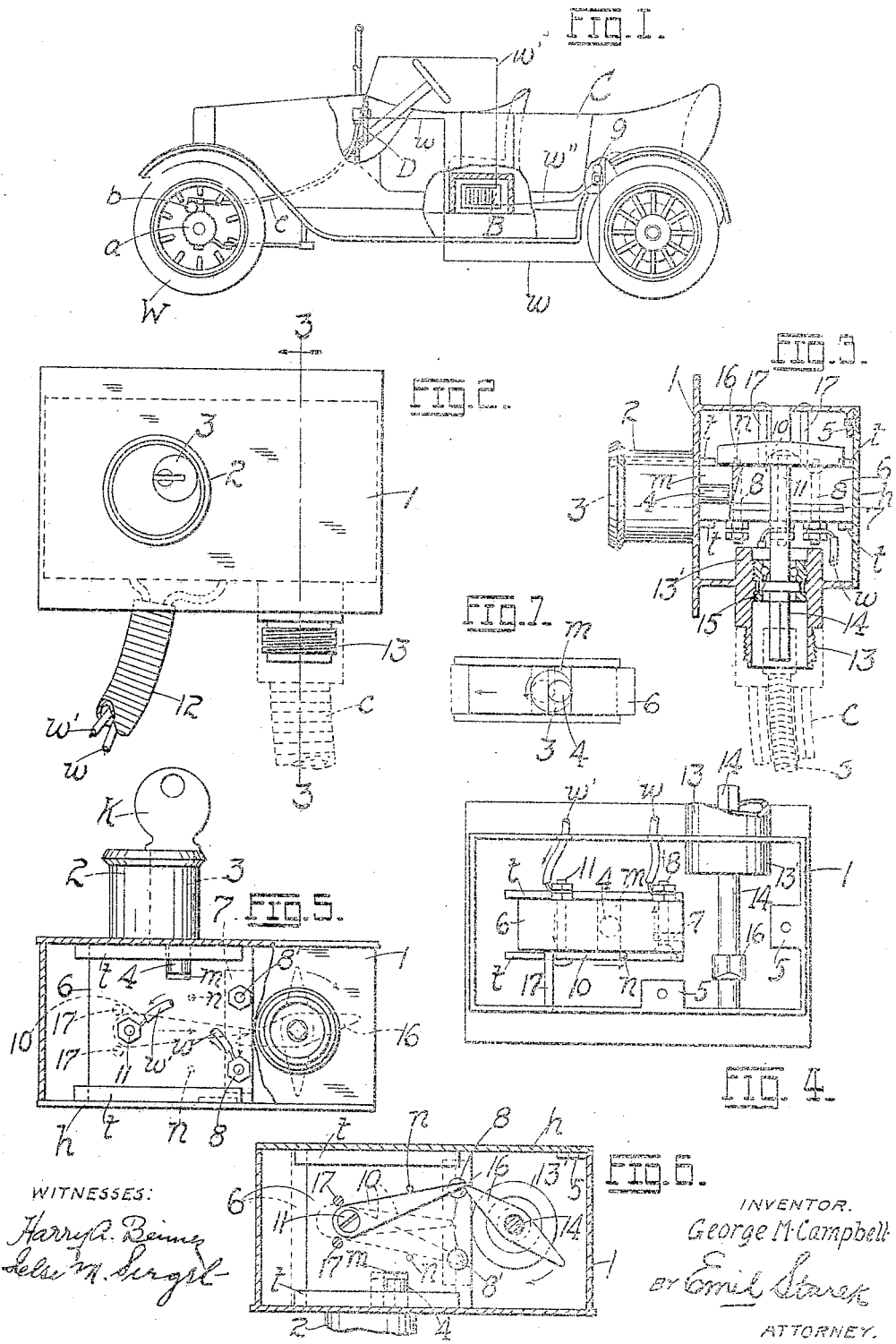
G. M. CAMPBELL.
AUTOMOBILE ALARM.
APPLICATION FILED JULY 28, 1919.
1,347,495. Patented July 27, 1920.
WITNESSES:
INVENTOR.
George M. Campbell
by Emil Starek
ATTORNEY.

GEORGE M. CAMPBELL, OF ST. LOUIS, MISSOURI.

AUTOMOBILE-ALARM.

1,347,495.  Specification of Letters Patent.  Patented July 27, 1920.

Application filed July 28, 1919. Serial No. 313,779.

*To all whom it may concern:*

Be it known that I, GEORGE M. CAMPBELL, a citizen of the United States, residing at St. Louis, State of Missouri, have invented certain new and useful Improvements in Automobile-Alarms, of which the following is a full, clear, and exact description, reference being had to the accompanying drawings, forming a part hereof.

The present invention is directed to improvements in automobile alarms, and has for its object to provide an automobile with an alarm (preferably electric) which will be set in operation in the event an unauthorized person tampers with the car or makes an attempt to steal the same. A further object is to provide an alarm that may be attached to any make of automobile, one which is simple in construction, reliable, cheap, and easily applied, and one possessing further and other advantages better apparent from the following detailed description in connection with the accompanying drawings in which—

Figure 1 represents a side elevation of an automobile having my invention applied thereto; Fig. 2 is a front elevation of the alarm attachment; Fig. 3 is a vertical cross-section on the line 3—3 of Fig. 2; Fig. 4 is a rear elevation with the rear wall of the casing removed; Fig. 5 is a bottom plan with a portion of the bottom wall of the casing broken away; Fig. 6 is a top plan with the top wall of the casing broken away; and Fig. 7 is a diagrammatic view of the front end of the sliding block carrying the switch, showing the transverse groove in the block and eccentric pin traversing the groove.

Referring to the drawings, C, represents a conventional car or automobile, the front wheel W of which carries the usual spur gear *a* with which meshes a pinion *b* imparting rotation to the flexible driving member or shaft *s* protected, as well understood in the art, by an outer flexible sleeve or casing *c*, the shaft *s* usually constituting the drive for the speedometer generally mounted on the dash or instrument board D of the vehicle. The features aforesaid are well known in the art, and are alluded to herein for the reason that in the present embodiment of my invention the flexible shaft *s* is made use of as a driving member for the rotary spindle or shaft of the casing forming the housing for the electric switch which starts the alarm when moved to a position to close the electric circuit on which the sounding of the alarm depends, the alarm herein being preferably in the form of an electric bell well understood in the art.

The attachment or device comprises an outer box or casing 1 the front wall of which is provided with the escutcheon 2 in which is mounted the rotatable key-operated plug or cylinder 3 of a conventional Yale (or equivalent) lock, the inner end of the plug terminating in an eccentrically positioned pin 4 as shown (Figs. 3, 4, 5, and 7). The rear cover plate *h* of the casing is removable to permit of access to the interior, being secured in position by means of screws passed through lugs 5 leading from two contiguous walls of the casing. Formed on the inner faces of the front and rear walls of the casing 1 are guide strips *t*, *t*, disposed in pairs, between which is slidably mounted a block or mounting of fiber or equivalent insulating material 6, one end of which (the inner end) has embedded in it a metallic strip or plate 7 through which are passed two pins 8, 8', the former functioning as a binding post for the conducting wire *w* leading to an electric bell 9, the adjacent exposed terminals of the pins serving as contacts for the free end of an oscillating switch 10 mounted pivotally to the block 6 on the face through which the smooth contact terminals of the pins are exposed. The pivot pin 11 of the switch functions as a binding post for one end of the conducting wire *w'* leading to the battery B, a third wire *w"* leading from the battery to the bell 9 (Fig. 1). The wires lead through the casing 1 and are preferably protected by a flexible sleeve or casing 12 as shown (Fig. 2). Leading from the bottom wall of the casing 1 is a screw nipple 13 to which the upper end of the casing *c* of the flexible shaft *s* is attached, the shaft itself being coupled to the adjacent or lower end of a spindle 14, the spindle being supported at its upper end in the top wall of the casing 1, the lower portion of the spindle operating in a roller bearing 15 in the inner extension 13' of the nipple 13. Secured to the spindle 14 (and suitably insulated therefrom) between the block 6 and the upper wall of the casing, and revolving in the plane of oscillation of the switch 10, is a two-armed dog or tripper 16 either arm of which is adapted to impinge against the free end of the switch and move the same into engagement with either of the contacts 8, 8', depending on the direction of rotation of the spindle, when the block 6 is moved sufficiently to bring the free end of the switch in the path of travel of the dog or near enough to foul the dog. Ordinarily, the position of the block 6 is such that the switch is out of reach of the arms of the dog, a slight inward movement however being sufficient to bring the switch in the path of the dog and cause the switch to be oscillated into engagement with one of the contacts 8, 8'. This movement is accomplished as follows: The front end of the block 6 is provided with a transverse groove $m$ which is traversed by the eccentric pin or stud 4; and when the plug 3 carrying the stud is turned by the key K in one direction the block will be shifted inwardly or toward the spindle 14, and when the key is turned in the opposite direction the block will be shifted away from the spindle, the sliding movements imparted to the block by the pin 4 resulting from the action of the pin against the side walls of the groove $m$ as clearly obvious from the drawings (Fig. 7). Leading from the top wall of the casing 1 on opposite sides of the hinge axis (pivot pin 11) of the switch 10 and disposed parallel to said axis and across the plane of movement of the block 6, are resetting pins 17, 17, which, with a return of the block 6 to its normal position, open the switch 10 and restore the same to its central normal position between the contacts 8, 8', bringing the free end of the switch in the path of rotation of the arms of the dog 16 and in readiness to be impinged by the dog when the block is subsequently moved toward the spindle 14 to cause an alarm to be sounded in the event some one tampers with the machine.

The operation is substantially as follows: When the car is in service, the block 6, by a rotation of the plug 3 in proper direction, is moved or adjusted to a position to bring the free end of the switch 10 out of the path of rotation of the dog 16. In this movement (which we may term as the outward movement), and assuming that the switch had previously been in engagement with the inner contact 8 (Fig. 6), the top pin 17 will ride along the inner edge of the switch and depress the latter to the intermediate dotted central or open position shown in said figure. Had the switch been in engagement with the outer contact 8' then in the movement aforesaid, the outer pin 17 would have correspondingly pushed the switch to its central open position. In either case the movement of the switch is an oscillatory one from one contact 8 toward the opposite contact 8' (or vice versa) the free end of the switch describing an arc whose cosine progressively increases as the switch approaches the horizontal (Figs. 5, 6,) or as said end moves away from the contact. This throw of the switch brings the free end of the switch in the path of rotation of the dog 16 when the block is subsequently moved toward the spindle 14. Thus, in Fig. 5 where the dotted position of the switch 10 corresponds to the intermediate dotted position in Fig. 6, and in which Fig. 5 the block 6 is shown moved inward, it will be seen that the free end of the switch is in the direct path of rotation of the arms of the dog, so that the dog will oscillate or trip the switch into engagement with either the contact 8 or 8' depending on the direction in which the dog is rotating. As previously described, when the engine is running and the car is started, the flexible shaft $s$ will rotate the spindle 14 and the dog 16 carried thereby. When therefore the block 6 is moved inward so as to cause the switch to foul the dog, the latter will strike or trip the switch and carry it along until the same engages either one or the other of the contacts 8, 8', depending on the direction of rotation of the spindle 14, this direction being determined by the direction of travel of the car (forward or backward). The switch having been tripped by the dog and moved into engagement with one of the contacts (8, 8',) the dog then simply passes off the switch and continues on in its rotation with the further travel of the vehicle. The moment however, that the switch 10 engages either contact 8, 8', this closes the electric circuit and the bell starts ringing, thus sounding an alarm and giving notice to the public generally and to the police and to the owner of the car that some unauthorized person is tampering with the car or is attempting to steal it. Only the owner of the car or some authorized person who has the key can set the alarm by moving the block 6 with its switch 10 to proper position to bring the free end of the switch in the path of rotation of the dog (Fig. 5). If no one tampers with the machine, then when the owner is ready to start the car he takes the key K, and by rotating the plug 3 in proper direction, or away from the spindle 14 so as to bring the free end of the switch out of the path of the dog (see dotted position of the block and middle dotted position of the switch in Fig. 6), whereupon the car may run without affecting the alarm. Of course if the car is not tampered with and the switch 10 is not disturbed from its normal or open position between the contacts 8, 8', then the restoring or resetting pins 17 perform no function, that is to say, they do not actuate the switch. It is only when the latter has been tripped by the dog and swung into engagement with one of the contacts 8, 8', with the starting of the car by unauthorized persons, (Fig. 6), that the pins 17 come into play by resetting the switch for restoring the same to normal position between the contacts as previously described. As a precaution the throw of the switch 10 is limited by the pins or pegs carried by the block 6, so that the switch does not accidentally slip past the contacts 8, 8'.

It will be observed (Fig. 6) that the resetting pins 17, 17, are to one side of the axis of oscillation of the switch 10 when the block 6 is moved to proper position to bring the switch in the path of rotation of the dog 16. This position of the pins allows for a free oscillation of the switch when impinged upon by the dog or tripper because the pins exert no binding action on the switch. The pins being moreover in close proximity to the axis of the switch, it follows that a slight movement of the block 6 outward or away from the spindle 14 will cause the pin riding on the edge of the switch to throw the switch back through a sufficient arc to restore it to its central open position.

Obviously, the alarm element need not be in the form of a bell, any other form of alarm or signal falling within the scope of my invention; neither need the switch be restricted to an oscillating or pivoted switch, nor need the spindle 14 be driven by the conventional speedometer drive as here shown. It may be driven from any rotating part of the running gear or driving gear of the car. Other changes may be resorted to without affecting the nature or spirit of the invention. The bell or other form of alarm should be so located on the car as to be concealed or out of ready reach of the automobile thief; otherwise it might be possible for him to destroy the bell in advance of starting the car. In the majority of cases of theft of cars however, the thief does not stop to look for alarms, and as the sounding of the alarm is instantaneous the moment he starts the car, it follows that the thief can be readily apprehended.

Having described my invention what I claim is:

1. In an alarm of the character described, a suitable casing, a movable block mounted therein, a switch pivotally secured to said block, a rotatable spindle in the casing, a tripper or dog on the spindle adapted to foul the switch and oscillate the same through a limited arc for one position of the block and to clear the switch for another position of said block, contacts on the block for engaging the switch when the latter has been oscillated by the dog, a source of electric energy, an electric circuit, an alarm or signal in the path of said circuit, and suitable electric connections between the switch and contacts aforesaid and said circuit.

2. In an alarm of the character described, a suitable casing, a key-operated rectilinearly sliding block mounted therein, a switch pivotally secured to the block, a rotatable spindle in the casing, a dog on the spindle adapted to throw the switch in a given direction with a movement of the block toward the spindle and to clear the switch with a movement away from the spindle, contacts on the block for engaging the switch when thrown by the dog, an electric circuit for the switch and contacts aforesaid, and means on the casing for engaging the switch when closed and returning the same to normal open position out of engagement with the contacts, with a movement of the block away from the spindle.

3. In an alarm of the character described, a suitable casing, a rectilinearly sliding block mounted in the same, a switch pivoted to one of the faces of the block, a rotatable tripper in the casing for actuating the switch, a pair of contacts on the block spaced apart and positioned to be respectively engaged by the switch when the latter is thrown by the tripper in either direction from its normal open position between the contacts, and a pair of resetting members on the block spanning the switch and disposed across the plane of movement of the block and to one side of the hinge axis of the switch when the block is moved toward the tripper, one of the members operating to restore the switch to open or normal position with a movement of the block away from the tripper.

4. In an alarm of the character described, a suitable casing, a block mounted therein and capable of a rectilinear reciprocating movement, a groove at one end of the block, a key-operated plug in the casing, an eccentrically mounted pin on the plug traversing the groove of the block to impart thereto the reciprocating movement aforesaid, guides on the casing for guiding the block in its reciprocations, an electric switch pivoted to the block, contacts on the block for engaging the switch when oscillated from its normal open position between the contacts, a rotatable tripper member operating to throw the switch into engagement with one of the contacts with a movement of the block toward the tripper, and suitable resetting devices on the casing for restoring the switch to its normal open position between the contacts with a movement of the block in the opposite direction.

5. In an alarm of the character described, a reciprocable block, an oscillating switch mounted on one face thereof, contacts on the block spaced apart for engaging the free end of the switch, a casing, and parallel resetting pins on the casing disposed on opposite sides of the axis of oscillation of the switch and across the plane of reciprocation of the block, as set forth.

In testimony whereof I affix my signature in presence of two witnesses.

GEORGE M. CAMPBELL.

Witnesses:
EMIL STAREK,
ELSE M. SIEGEL.